(12) United States Patent
Bailey (10) Patent No.: US 7,603,588 B1
(45) Date of Patent: Oct. 13, 2009

(54) TWO-STAGE DETECTION OF TRACE IDENTIFIER MISMATCHES

(75) Inventor: David Bailey, Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 856 days.

(21) Appl. No.: 10/827,720

(22) Filed: Apr. 20, 2004

(51) Int. Cl.
*G06F 11/00* (2006.01)

(52) U.S. Cl. ............................ 714/43; 714/4; 714/45; 370/248

(58) Field of Classification Search .................. 714/43, 714/4
See application file for complete search history.

(56) References Cited

U.S. PATENT DOCUMENTS

| | | | |
|---|---|---|---|
| 6,226,270 B1 * | 5/2001 | Chiku et al. ................. | 370/248 |
| 6,246,668 B1 * | 6/2001 | Kusyk ......................... | 370/228 |
| 6,426,958 B1 * | 7/2002 | Crossett et al. ............. | 370/466 |
| 6,647,519 B1 * | 11/2003 | Lometti et al. .............. | 714/715 |
| 6,658,607 B1 | 12/2003 | Michel et al. | |
| 6,982,983 B2 * | 1/2006 | Ota et al. .................... | 370/401 |
| 2004/0190446 A1 | 9/2004 | Ansorge et al. | |

* cited by examiner

*Primary Examiner*—Yolanda L Wilson
(74) *Attorney, Agent, or Firm*—Edell, Shapiro & Finnan, LLC (57) ABSTRACT

Methods and apparatus for processing a trace mismatch by using hardware to detect a change in a trace string and software to perform string analysis are disclosed. In accordance with one aspect of the present invention, a method for detecting a trace identifier mismatch using a detection system with a hardware component and a software component includes detecting a change in trace information associated with the path using the hardware component. The method also includes providing an indication of the change in trace information using the hardware component, obtaining the indication from the hardware component using the software component, and analyzing the trace information using the software component to determine if a trace identifier mismatch is present.

25 Claims, 7 Drawing Sheets

TWO-STAGE DETECTION OF TRACE IDENTIFIER MISMATCHES

BACKGROUND OF THE INVENTION

1. Field of Invention

The present invention relates generally to network systems. More particularly, the present invention relates to efficiently detecting trace identifier mismatches using a system which includes hardware and software.

2. Description of the Related Art

The demand for data communication services is growing at an explosive rate. Much of the increased demand is due to the fact that more residential and business computer users are becoming connected to the Internet. To address the demand for data communication services, the use of optical networks, such as a synchronous digital hierarchy (SDH) network or a synchronous optical network (SONET), is becoming more prevalent. SONET and SDH networks are examples of time division multiplexed (TDM) networks. TDM networks generally allocate single lines to be used amongst multiple users, or customers of data communication services. The single lines may each be divided into slots of time during which each user has access to the single lines.

Figure 1:
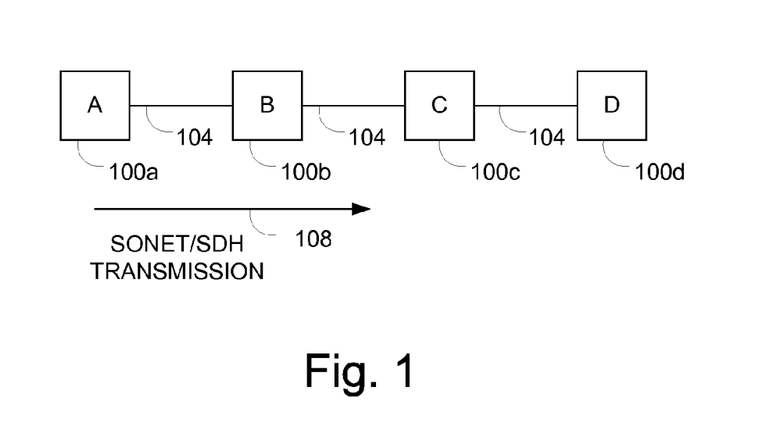
FIG. 1 is a diagrammatic representation of nodes and links across which a transmission may be sent.

A network typically includes multiple nodes which are in communication over data lines. As shown in FIG. 1, nodes 100 are in communication with each other through lines 104 such that a string 108 that is sent from node 100a to node 100d passes through nodes 110b, 100c. String 108 is a transmission, and may be of a format such as a SONET format or an SDH format. As will be understood by those skilled in the art, string 108 may include overhead bytes that contain trace identifier strings. Trace identifier strings are unique sequences of bytes that effectively identify a transmitting source. Different formats of sequences of bytes are substantially defined by architectural standards.

In general, J0, J1, and J2 overhead bytes contain trace identifier strings. A J0 overhead byte may be used to monitor a regenerator sections level. A J1 overhead byte may be used as a path trace monitoring string to monitor a SONET path level, or an SDH VC-4 higher-order path as well as an SDH VC-3 high-order and lower-order paths, as appropriate. A J2 overhead byte may be used to monitor a SONET virtual tunnel level or SDH VC-2, VC12, or VC11 lower-order paths.

Figure 2A:
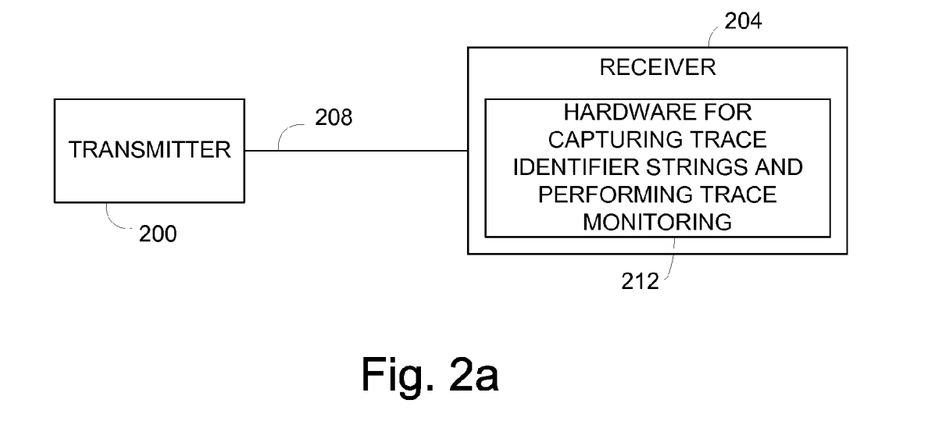
FIG. 2a is a diagrammatic representation of a detection system in which trace identifier mismatches are detected using only hardware.
Figure 2B:
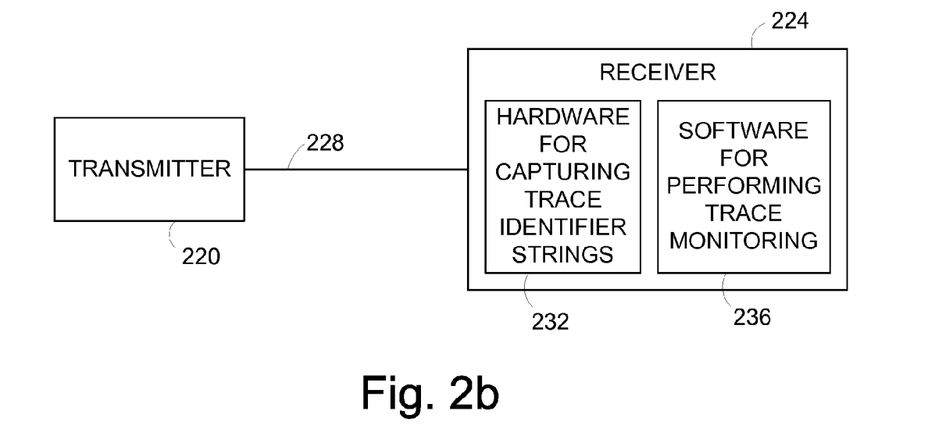
FIG. 2b is a diagrammatic representation of a detection system in which hardware substantially only captures trace identifier strings while software detects mismatches in the trace identifier strings.

Conventionally, a transmission such as a SONET or an SDH transmission that includes overhead bytes which contain trace identifier strings are sent from a transmitting source to a receiving source, e.g., from a node such as node 100a to an intermediate receiving node such as node 100b or to a destination node such as node 100d. The receiving source is typically arranged to perform trace monitoring. Some receiving sources use hardware both to capture trace identifier strings and to perform trace monitoring, while other receiving sources use hardware to capture trace identifier strings and software to perform trace monitoring. As shown in FIG. 2a, a transmitter 200 may be in communication with a receiver 204 across a link 208. Link 208 typically carries transmissions from one up to approximately 192 high order circuits. Receiver 204 includes hardware 212 which both captures trace identifier strings and performs trace monitoring substantially sequentially on each of the circuits associated with link 208. Alternatively, FIG. 2b shows a transmitter 220 that is in communication across a link 228 with a receiver 224 that includes both a hardware component 232 and a software component 236. Hardware component 232 is arranged to capture trace identifier strings, and software 236 is arranged to perform trace monitoring substantially sequentially on each circuit that is associated with link 208.

Figure 3A:
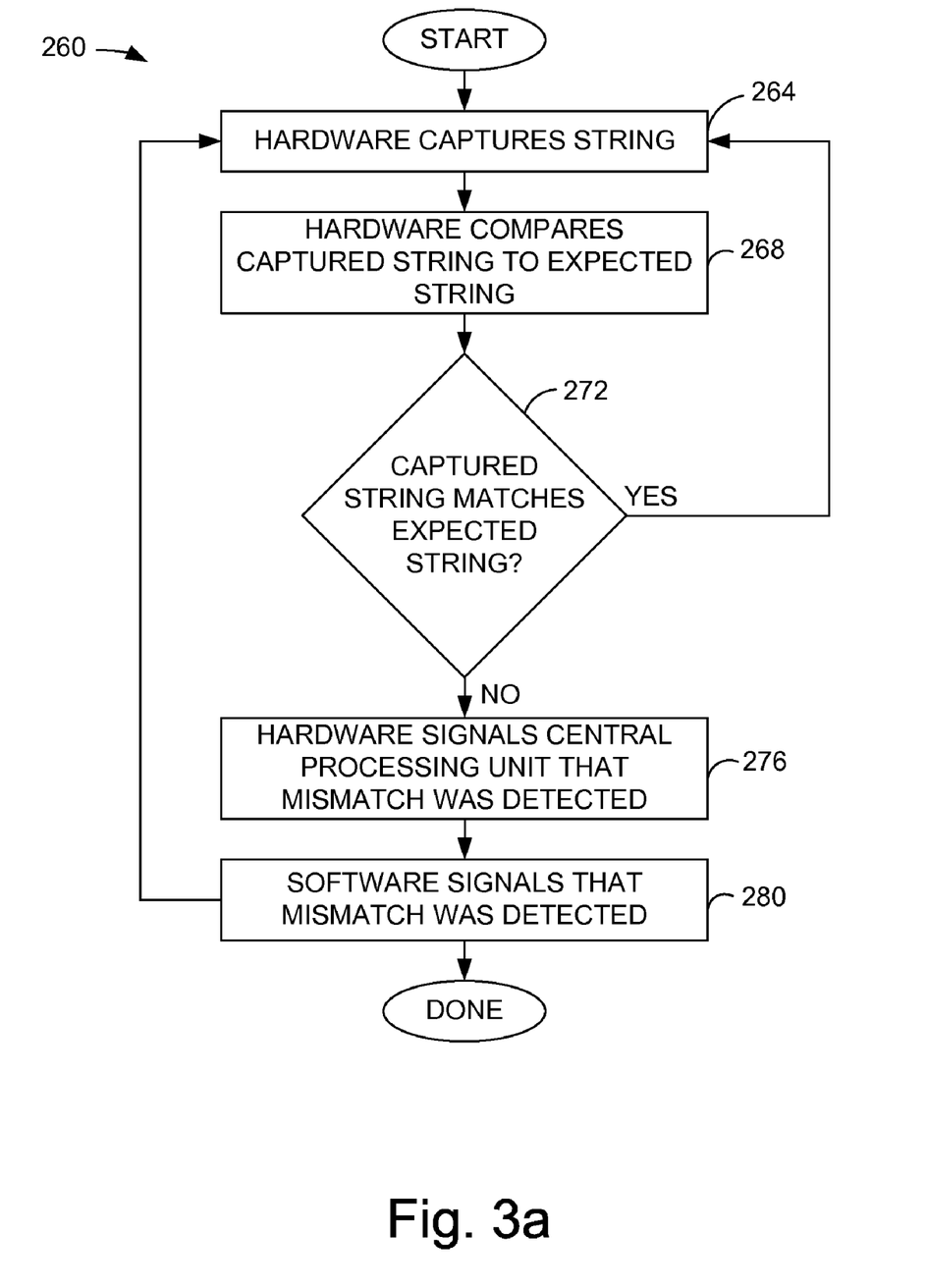

When a trace identifier mismatch is detected, a notification of the trace identifier mismatch is usually provided, as for example to a network administrator, so that issues which caused a trace identifier mismatch may be resolved. FIG. 3a is a process flow diagram which illustrates the steps associated with detecting and providing notification of a trace identifier mismatch using a system in which trace monitoring is performed using hardware, e.g., the system of FIG. 2a. A process 260 of performing string analysis on a string associated with a given circuit begins at step 264 in which hardware captures a string. Typically, the string that is captured is a 64-byte string from SONET and a 16-byte string for SDH, which are stored in memory included in the hardware. Once a string is captured, the hardware compares the captured string to an expected string in step 268. It should be appreciated that an expected string is generally stored in memory included in the hardware after the expected string is provided, as for example by an owner of the line card of which the hardware is a part.

A determination is made in step 272 as to whether the captured string matches the expected string. That is, it is determined whether the captured string includes an expected byte sequence. If it is determined that the captured string matches the expected string, then process flow returns to step 264 in which the hardware captures another string. Alternatively, if it is determined that the captured string does not match the expected string, then the indication is that there is a trace identifier mismatch. As such, in step 276, the hardware signals a central processing unit, e.g., a central processing unit associated with the line card, that a trace identifier mismatch was detected. Then, in step 280, software that is in communication with the central processing unit signals that a mismatch was detected. Once the software signals, as for example to a network administrator, that a mismatch was detected, the process of performing string analysis returns to step 264 in which hardware captures a string. Signaling that a mismatch was detected allows steps to be taken to correct issues which resulted in a trace identifier mismatch.

Figure 3B:
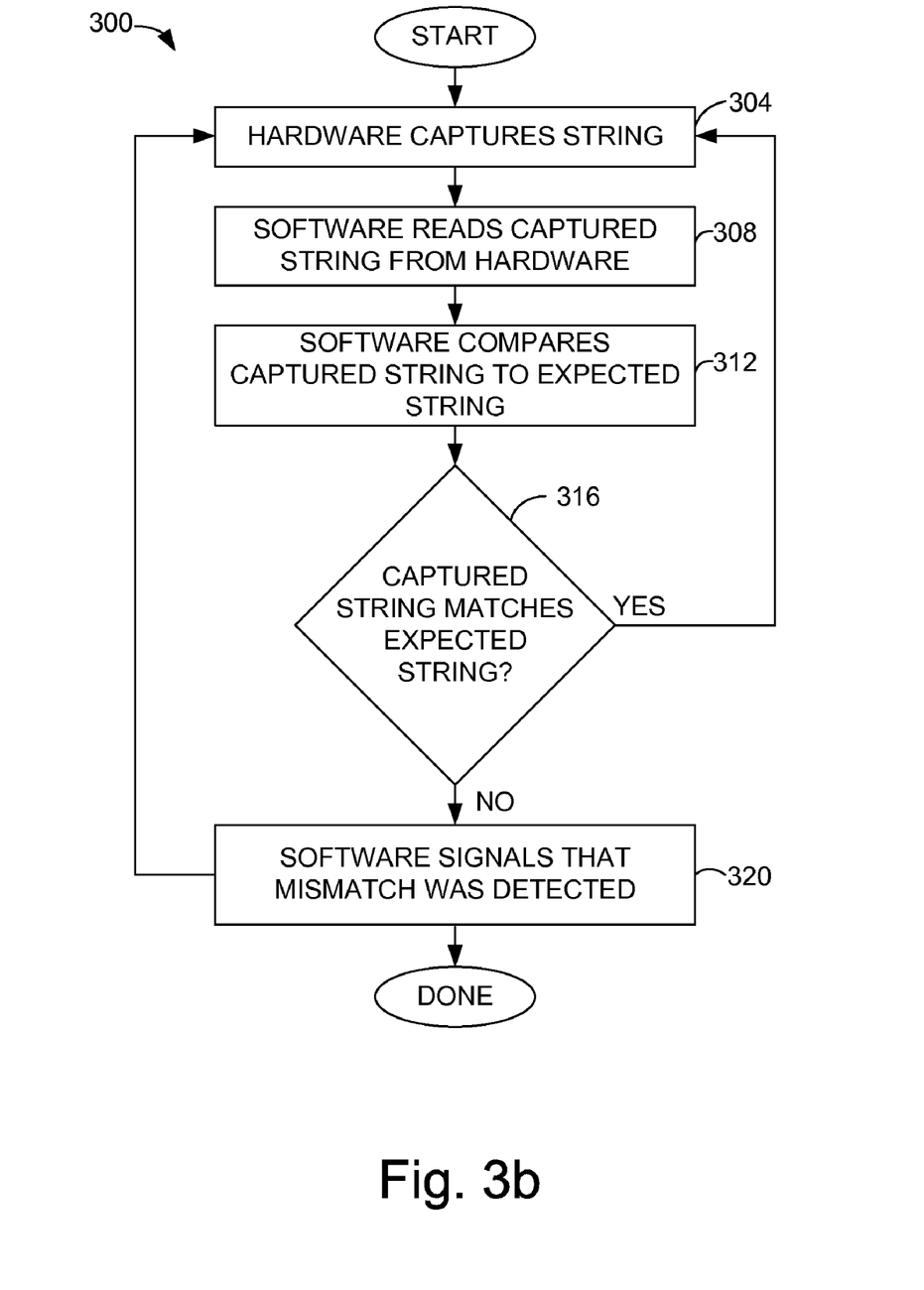
FIG. 3b is a process flow diagram which illustrates the steps associated with detecting and providing notification of a trace identifier mismatch using a system in which trace monitoring is performed using software, e.g., the system of FIG. 2b.

With reference to FIG. 3b, the steps associated with performing string analysis using a combination of hardware and software, e.g., using the system of FIG. 2b, will be described. A process 300 of performing string analysis begins at step 304 in which hardware captures a string, e.g., a 64-byte string. Once the hardware captures the string, software then reads the captured string from the hardware in step 308. Then, in step 312, the software compares the captures string to an expected string, and it is determined in step 316 whether the captured string matches the expected string.

If the determination in step 316 is that the captured string matches the expected string, then there is no trace identifier mismatch, and process flow returns to step 304 in which the hardware captures another string. Alternatively, if it is determined that the captured string does not match the expected string, then the software signals that a mismatch was detected, and process flow returns to step 304 in which the hardware captures another string.

The monitoring of trace identifier strings generally enables verifications to be made that a circuit is properly connected, and that transmissions along a given circuit are occurring as expected. Monitoring trace identifier strings generally requires substantial resources and significant data processing. For each circuit or path, monitoring a trace string requires capturing a continuous string of bytes, determining the format of the string, identifying the start of the string, comparing the trace string to an expected string, and effectively raising an alarm if the trace string does not match an expected string.

As the number of circuits that are to be monitored increases, the hardware memory requirements needed in a trace identifier mismatch detection system increases. When a relatively large number of circuits are to be monitored, it may not be possible to provide enough memory to support the monitoring of the relatively large number of circuits. Further, as the number of circuits increases, the average time to detect a trace mismatch increases, as the trace monitoring is such that circuits are monitored in a sequential manner. By way of example, since each circuit of path is generally visited three times before a defect or a trace mismatch is detected, in a system with 192 circuits, 576 circuits must effectively be monitored before a trace mismatch for each circuit may be detected. Hence, the time between when a trace mismatch arises and when the trace mismatch is detected may be relatively significant. As a result, within a system in which specifications are such that a trace mismatch is effectively required to be detected within a certain amount of time, it may not be possible to support all the circuits and still meet minimum acceptable levels of system performance.

Therefore, what is needed is a trace mismatch detection system that operates efficiently and is suitable for supporting a relatively high number of circuits. That is, what is desired is a trace mismatch detection system which is scalable to support both a relatively low number of circuits and a relatively high number of circuits, does not require a significant amount of memory, and has relatively fast detection and processing times.

SUMMARY OF THE INVENTION

The present invention relates to efficiently identifying trace identifier mismatches within a network. According to one aspect of the present invention, a method for detecting a trace identifier mismatch along a path using a detection system with a hardware component and a software component includes detecting a change in trace information associated with the path using the hardware component. The method also includes providing an indication of the change in trace information using the hardware component, obtaining the indication from the hardware component using the software component, and analyzing the trace information using the software component to determine if a trace identifier mismatch is present.

In one embodiment, the method also includes detecting the change in trace information associated with the path includes performing a cyclic redundancy check on the trace information. In another embodiment, the method also includes capturing the trace information using the hardware component, and reading the trace information from the hardware component using the software component.

A detection system which uses hardware to detect changes in trace information and software to analyze substantially only those traces in which changes have been detected allows trace identifier mismatches to be detected efficiently. In such a detection system, the amount of memory needed within the hardware may be substantially minimized, while minimum amounts of resources and time consumed to detect a defect associated with a circuit are reduced. Further, in addition to the efficient use of both hardware and software to detect and to process a trace identifier mismatch, such a detection system enables a multiplicity of circuits or paths to be continuously monitored substantially simultaneously.

According to another aspect of the present invention, a method for detecting a trace identifier mismatch along a path within a network using a detection system with a hardware component and a software component involves receiving at least a first byte sequence and a second byte sequence associated with the path on the hardware component, and determining when the first byte sequence differs from the second byte sequence on the hardware component. The method also includes providing an indication that the first byte sequence differs from the second byte sequence using the hardware component when it is determined that the first byte sequence differs from the second byte sequence.

In one embodiment, the software component obtains the indication from the hardware component, and also obtains the first byte sequence form the hardware component. In such an embodiment, the software component also determines when the first byte sequence substantially matches an expected byte sequence, and raises a trace identifier mismatch when it is determined that the first byte string does not substantially match the expected byte sequence.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 3a is a process flow diagram which illustrates the steps associated with detecting and providing notification of a trace identifier mismatch using a system in which trace monitoring is performed using hardware, e.g., the system of FIG. 2a.

DETAILED DESCRIPTION OF THE EMBODIMENTS

Monitoring trace strings such as J0, J1, and J2 path trace strings generally require a substantial amount of data processing. Monitoring a single trace string associated with a circuit or a path generally requires capturing a continuous string of bytes, determining a format of the string, determining the start of the string, and comparing the captured string with an expected string to identify a mismatch. In general, systems used to monitor trace strings have significant hardware requirements, and utilize a relatively significant amount of resources and time in order to detect a defect associated with a circuit. Further, when multiple formats are to be supported, e.g., formats such as both a synchronous digital hierarchy (SDH) format and a synchronous optical network (SONET) format, the hardware generally needs to be changed.

By using hardware to detect changes in trace information, and software to analyze substantially only those traces in which changes have been detected, the amount of memory needed within the hardware may be substantially minimized, while minimum amounts of resources and time consumed to detect a defect associated with a circuit are reduced. A two-stage trace identifier mismatch detection system which includes hardware to detect changes in trace information and software to analyze traces in which changes have been detected efficiently uses both hardware and software to detect and to process a trace identifier mismatch, while allowing for a multiplicity of circuits or paths to be continuously monitored substantially simultaneously. Additionally, a two-stage trace identifier mismatch detection system enables new or additional formats to be supported substantially without necessitating changes to hardware.

Figure 4:
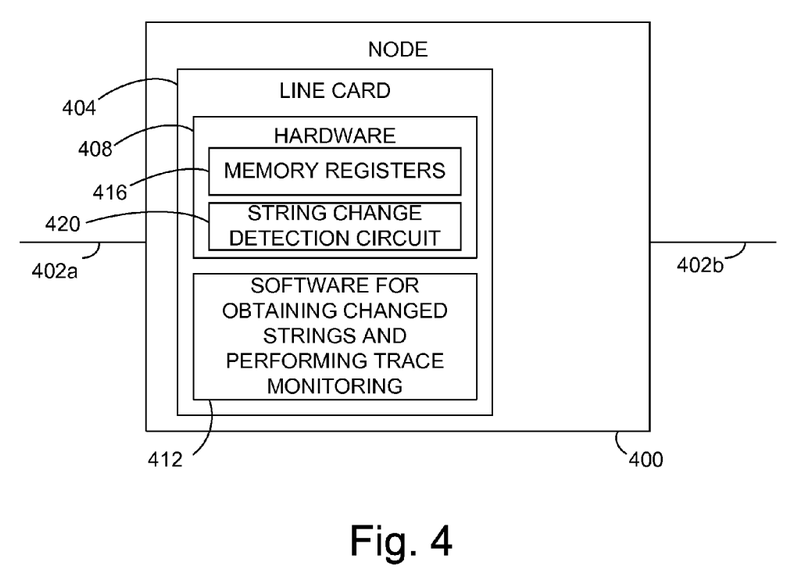
FIG. 4 is a diagrammatic representation of a node within a network that includes a line card with a hardware component which substantially only detects a change in a trace string and a software component which performs the analysis needed to detect a trace identifier mismatch in accordance with an embodiment of the present invention.

FIG. 4 is a diagrammatic representation of a node within a network that includes a line card with a hardware component which substantially only detects a change in a trace string and a software component which performs the analysis needed to detect a trace identifier mismatch in accordance with an embodiment of the present invention. A node 400, which may be a router in one embodiment, is arranged to receive traffic on a network link 402a and to send traffic on a network link 402b. Node 404 may be arranged to receive strings formatted in substantially any suitable format, as for example an SDH format or a SONET format. Strings received on network link 402 may include overhead bytes which, as will be appreciated by those skilled in the art, may include J0, J1, and J2 bytes. Such "J-bytes" may include information that may be read to determine where a string originated, and to verify that a circuit within a network is properly connected. J0 bytes may include information pertaining to connections between sections of a circuit, J1 bytes may include path level information associated with a start point and an end point of an overall circuit, and J2 bytes may include connection information on an overall virtual tributary circuit.

A line card 404 within node 400 includes a hardware component 408 and a software component 412. Hardware component 408 generally includes memory registers 416 in which information may be stored and a string change detection circuit 420 which is arranged to detect changes in byte sequences of strings. Hardware component 408 is arranged to monitor substantially any number of circuits associated with line card 404, and includes an arrangement (not shown), as for example a port, that is arranged to receive strings. String change detection circuit 420, which is generally not trace format-specific, may use any suitable technique, e.g., a cyclic redundancy check technique, to determine when a change in a string has been detected. In one embodiment, string change detection circuit 420 may perform a mathematical calculation on a block of data to return a number that uniquely identifies the data and its sequence.

Software component 412 is arranged to poll hardware 408 to determine if string change detection circuit 420 has detected a change in a byte sequence associated with a circuit which is associated with node 400. When software component 412 identifies that string change detection circuit 420 has detected a change in a byte sequence, software component 412 performs trace monitoring. In one embodiment, software component 412 performs string analysis on the string with a changed byte sequence, and identifies trace identifier mismatches.

A system, i.e., a two-stage detection system, which is suitable for detecting trace identifier mismatches using a hardware component which substantially only detects a change in a trace string and a software component which performs the analysis needed to detect a trace identifier mismatch enables potential trace identifier mismatches to be detected relatively quickly, reduces memory requirements needed to support a given number of circuits, and reduces the processing time needed to process strings to identify trace identifier mismatches. In addition, such a system enables the hardware to support substantially any format such that if new trace formats are to be supported by the system, a software upgrade would enable the system to support the new formats. Hence, a costly upgrade of hardware may effectively be avoided when new formats are to be supported.

A relatively fast detection time for detecting any trace identifier mismatches is afforded by a two-stage detection system since substantially continuous monitoring of paths or circuits may occur such that the amount of time which elapses before a change on a path is identified may be reduced. That is, substantially eliminating the need to monitor each path separately allows any trace identifier mismatches to be more rapidly identified since changes in each path are more efficiently identified. Hence, the minimum amount of time which would elapse before a change on a path is detected may be reduced from many seconds to approximately eight milliseconds.

Memory requirements associated with hardware in a two-stage detection system are generally significantly less than the memory requirements associated with conventional systems. For each path supported by a line card associated with the two-stage detection system, memory requirements are significantly less than the 128 bytes typically needed to store an expected string and to store a received string for each path. By way of example, in one embodiment, each path may use as few as approximately four bytes.

The use of a two-stage detection system within a line card reduces processing time needed to process a trace, e.g., a path trace, by enabling substantially all path or circuits associated with a line card to be monitored substantially simultaneously by hardware, while software monitors substantially only a path on which a change has been detected. The number of paths or circuits to monitor may be relatively high. By way of example, in some embodiments, a system may monitor over twenty thousand paths. As such, by substantially eliminating the need to schedule monitoring of each path in order to enable trace identifier mismatches or defects to be identified, processing time of a central processing unit may be significantly reduced.

Figure 5:
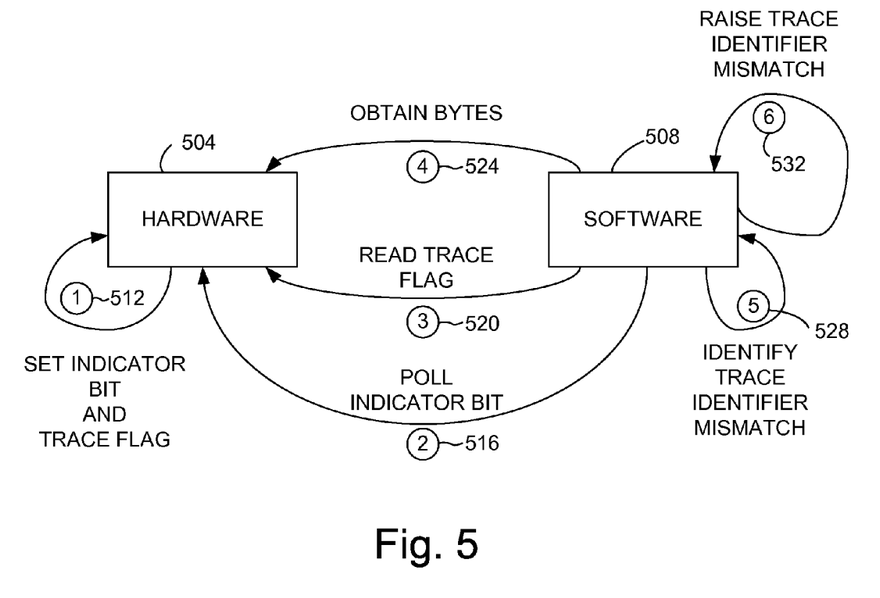
FIG. 5 is a diagrammatic representation of steps that are executed after hardware of a line card detects a change in a byte sequence in accordance with an embodiment of the present invention.

FIG. 5 is a diagrammatic representation of steps that are executed after hardware of a line card detects a change in a byte sequence in accordance with an embodiment of the present invention. When hardware 504 detects a string change, e.g., when hardware 504 determines that there may be a change in a trace string, hardware 504 sets an interrupt, indicator bit, or a flag in a step 512 which is arranged to be accessed by software 508. Hardware 504 also sets a trace flag or a change-detect flag which is arranged to indicate that a change in a trace string has been detected. In one embodiment, both the indicator bit and the trace flag are stored in memory registers associated with hardware 504.

Software 508 periodically polls hardware 504 or, more specifically, memory registers of hardware 504. Hence, in step 516, software 508 effectively polls the indicator bit set by hardware 504. Since substantially only a single indicator bit is generally polled, the polling process is relatively efficient. Upon polling the indicator bit, the software then reads the trace flag from a memory register associated with hardware 504 in step 520. Reading the trace flag generally enables software 508 to ascertain which circuit is associated with a changed trace string.

After reading the trace flag, software 508 requests hardware 504 to capture the trace string in which a change has been detected, then obtains bytes of the trace string in step 524. That is, software 508 reads the trace string in which a change has been detected from hardware 504. Software 508 then compares the obtained trace string to an expected trace string, which are generally provided to software 508 by a user of the line card which includes hardware 504 and software 508, in step 528 to identify a trace identifier mismatch. Once the trace identifier mismatch is identified, a trace identifier mismatch is raised in step 532. Raising a trace identifier mismatch effectively raises a flag which is intended to come to the attention of a network administrator who may then initiate a process to correct issues which resulted in the trace identifier mismatch being raised.

In general, hardware 504 effectively generically determines whether there has been a change in a byte sequence associated with a SONET or SDH transmission that is received on a line card (not shown) that is associated with hardware 504 and software 508. Software 508, when aware of a change in a byte sequence detected by hardware 504, performs string analysis on a string of bytes captured by hardware 504 to determine whether there is a trace identifier mismatch.

In the described embodiment, hardware 504 includes a string change detection circuit that uses a cyclic redundancy check technique to detect changes in a byte sequence. A cyclic redundancy check is a technique used to obtain data reliability and detects errors in blocks or strings of data. As will be appreciated by those skilled in the art, a cyclic redundancy check algorithm effectively treats a path bit stream or string as a binary polynomial and computes a frame check sequence, e.g., a 16-bit frame check sequence, for approximately every sixty four bytes from sixty four frames using a predefined polynomial, i.e., a divisor. Each frame check sequence is typically compared to a previous frame check sequence, and if there is a difference detected for consecutive comparisons, the most recent frame check sequence may effectively be saved by hardware 504. Additionally, hardware 504 will set an indicator bit and a trace flag, as discussed with reference to step 512.

Figure 6:
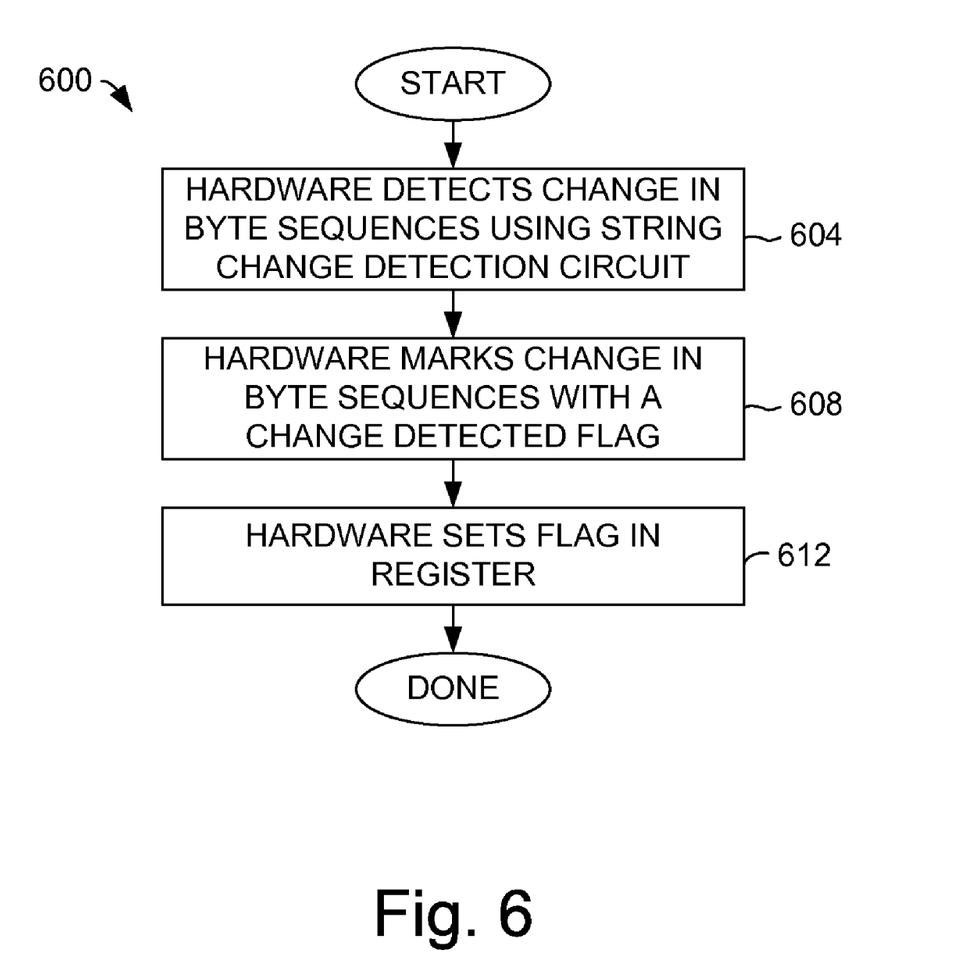
FIG. 6 is a process flow diagram which illustrates the steps associated with the operation of hardware, e.g., hardware 504 of FIG. 5, which detects changes in byte sequences on a circuit in accordance with an embodiment of the present invention.

FIG. 6 is a process flow diagram which illustrates the steps associated with the operation of hardware, e.g., hardware 504 of FIG. 5, which detects changes in byte sequences on a circuit in accordance with an embodiment of the present invention. A process 600 of operating hardware to indicate a change in byte sequences begins at step 604 in which the hardware detects in change in byte sequences associated with a circuit using a string change detection circuit such as string change detection circuit 420 of FIG. 4. As previously discussed, a string change detection circuit may be arranged to use a technique such as cyclic redundancy check to detect changes in byte sequences.

In general, the hardware may obtain the string, determines a format of the string, and identify a start of the string. Hence, it should be appreciated that detecting a change in byte sequences may typically include first obtaining the string, and in some instances, determining a format of the string and identifying the start of the string. Detecting a change in byte sequences may include identifying the format of the string and the start of the string in the event that the format of the string and the start of the string are not previously known.

When a change in byte sequences is detected, the hardware marks the change with a change-detect flag in step 608. The change-detect flag may be set in a hardware register. After the change-detect flag is set, the hardware sets an indicator bit or a flag in a register 612 which may be obtained by software during a polling process. Once the flag is set in a register, the process of operating hardware to indicate a change in byte sequences is completed.

Figure 7:
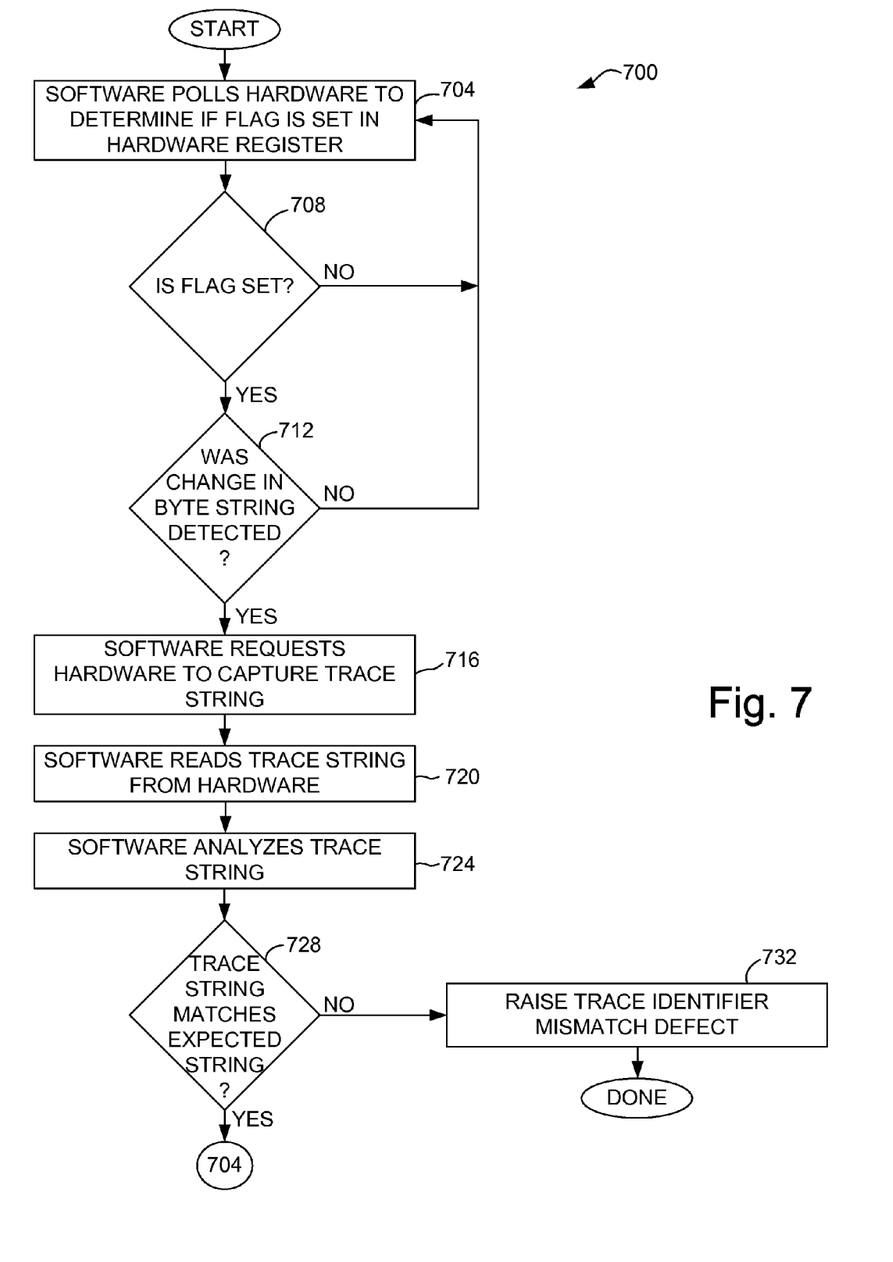
FIG. 7 is a process flow diagram which illustrates the steps associated with the operation of software which performs string analysis, e.g., software 508 of FIG. 5, in accordance with an embodiment of the present invention.

With reference to FIG. 7, the operation of software which performs string analysis will be described in accordance with an embodiment of the present invention. A process 700 of performing string analysis to identify a trace identifier mismatch begins at step 704 in which software of a line card polls hardware of a line card to determine if a flag or an indicator bit is set and stored in a hardware register that corresponds to a particular circuit. The flag that is set may generally indicate whether there is any issue associated with strings associated with the circuit that the hardware has detected and that the software should become aware of. Such a flag may be a bit that is set to high when the hardware has detected an issue associated with the strings. Polling the hardware often involves periodically accessing the hardware register in which the flag is stored to determine if the flag has been set.

A determination is made in step 708 as to whether a flag that indicates that the hardware has detected an issue to be addressed by the software has been set. If it is determined that the flag has not been set, then process flow returns to step 704 in which the software periodically polls the hardware to determine if the flag is set. Alternatively, if it is determined that the flag is set, it is determined in step 712 whether a change in a byte string was detected. Once the software ascertains that the flag was set, the software may obtain further bits from hardware registers to determine why the flag may have been set. Among the bits obtained from the hardware register may be a bit which corresponds to a change-detect flag or a trace flag which indicates that there was a change detected in a byte string associated with a circuit. A change detected flag or a trace flag may further be arranged to identify the circuit for which a change was detected in a byte string.

If the determination in step 712 is that a change in a byte string was not detected, the software may address the issue identified by the flag being set, and process flow may subsequently return to step 704 in which the software polls the hardware to determine if a flag is set in the hardware register. It should be appreciated that the software may generally be arranged to address a variety of issues. Hence, since the flag being set may indicate any number of issues which may be addressed by the software, the software may perform some processing even in the event that there is no change detected in the byte string.

Alternatively, if the determination in step 712 that a change in a byte string was detected, then the software requests the hardware to capture at least the trace identifier string stored in the overhead bytes of the overall byte string in step 716. In other words, the software requests that the hardware captures the trace string portion of the overall byte string. Once the hardware has captured the trace string, the software reads the trace string from the hardware in step 720. Then, in step 724, the software analyzes the trace string. Typically, analyzing the trace string includes comparing the trace string to an expected string.

A determination is made in step 728 regarding whether the trace string matches the expected string, i.e., whether the trace string is as expected. If it is determined that the trace string matches the expected string, then the indication is that there is no trace identifier mismatch. Accordingly, process flow returns to step 704 in which the software continues to poll the hardware.

If, on the other hand, the trace string is determined not to match the expected string in step 728, then the indication is that there is a trace identifier mismatch. As such, a trace identifier mismatch defect is raised by the software in step 732, and the process of analyzing a byte string to identify trace identifier mismatches is completed.

Figure 8:
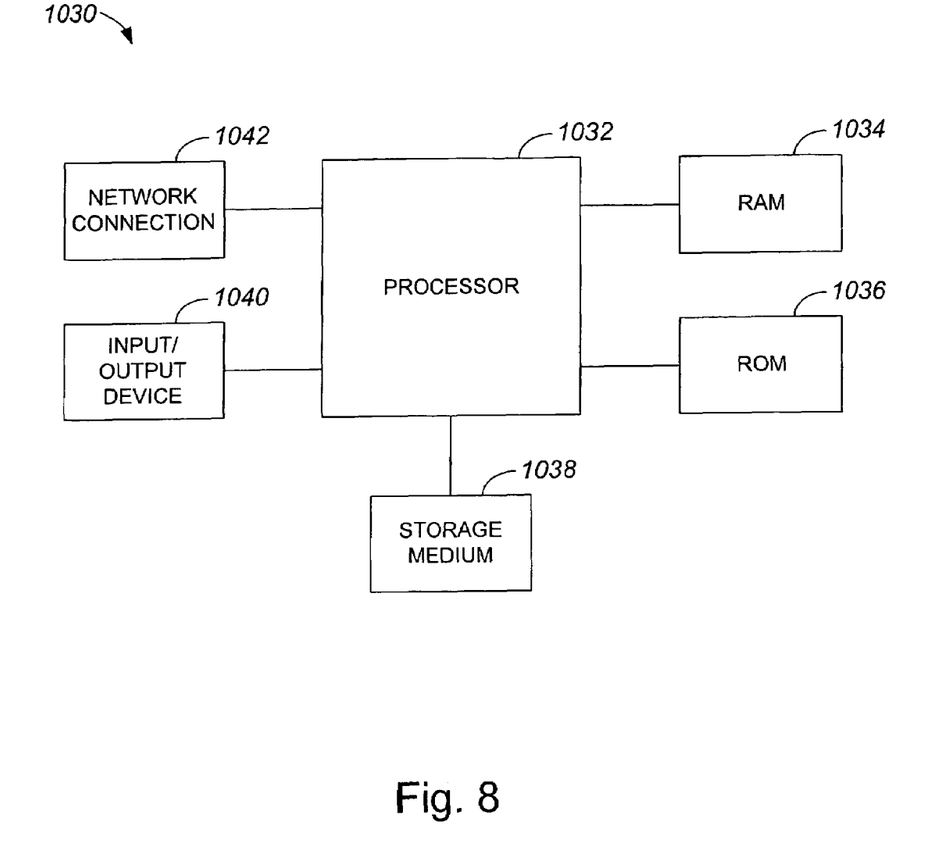
FIG. 8 illustrates a typical, general purpose computing device or computer system suitable for implementing the present invention.

FIG. 8 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, while a two-stage detection system used to process a trace identifier mismatch has been described as being suitable for use within either a SONET network or and SDH network, such a detection system may be used within substantially any suitable network. In general, the changes may be made to the software component of the system in order to accommodate a different format, i.e., a format that is appropriate for the network, while the hardware may remain substantially unchanged.

In general, links have been described as carrying transmissions from one up to approximately 192 high order circuits. It should be appreciated, however, that links may also carry transmissions of one up to approximately 768 high order circuits, or up to approximately twenty eight times 768 low order circuits per wavelength in some embodiments.

The steps associated with the various methods of the present invention may be altered, reordered, added, and removed without departing from the spirit or the scope of the present invention. For example, in lieu of effectively ending a process of performing string analysis once a trace identifier defect is raised, the process may instead continue to poll hardware to determine if a particular flag is set. That is, a process of performing string analysis may continue for a circuit even after a trace identifier mismatch is detected. Therefore, the present examples are to be considered as illustrative and not restrictive, and the invention is not to be limited to the details given herein, but may be modified within the scope of the appended claims.

What is claimed is:

1. A method for detecting a trace identifier mismatch along a path using a detection system, the detection system including a hardware component and a software component, the method comprising:

detecting a change in trace information associated with the path, the change in trace information being detected using the hardware component;

providing an indication of the change in trace information using the hardware component;

obtaining the indication from the hardware component using the software component; and analyzing the trace information using the software component to determine if a trace identifier mismatch is present.

2. The method of claim 1 further including:

raising a trace identifier mismatch defect using the software component when it is determined that the trace identifier mismatch is present.

3. The method of claim 1 wherein obtaining the indication from the hardware component using the software component includes polling a first memory register of the hardware component using the software component.

4. The method of claim 3 wherein providing the indication of the change in trace information using the hardware component includes storing an indicator in the first memory register.

5. The method of claim 4 further including storing a trace flag in a second memory register using the hardware component, wherein obtaining the indication from the hardware component using the software component further includes reading the trace flag.

6. The method of claim 1 wherein detecting the change in trace information associated with the path includes performing a cyclic redundancy check on the trace information.

7. The method of claim 1 further including:
capturing the trace information using the hardware component;
reading the trace information from the hardware component using the software component.

8. The method of claim 1 further including:
receiving the trace information on the hardware component.

9. A method for detecting a trace identifier mismatch along a path within a network using a detection system, the detection system having a hardware component and a software component, the hardware component including a memory, the method comprising:
receiving at least a first byte sequence and a second byte sequence associated with the path on the hardware component;
determining when the first byte sequence differs from the second byte sequence on the hardware component; and
providing an indication that the first byte sequence differs from the second byte sequence using the hardware component when it is determined that the first byte sequence differs from the second byte sequence, the indication being provided in the memory.

10. The method of claim 9 further including:
obtaining the indication using the software component;
obtaining the first byte sequence form the hardware component using the software component;
determining when the first byte sequence substantially matches an expected byte sequence using the software component; and
raising a trace identifier mismatch using the software component when it is determined that the first byte sequence does not substantially match the expected byte sequence.

11. The method of claim 10 further including:
capturing the first byte sequence using the hardware component.

12. The method of claim 9 further including:
obtaining the indication using the software component; and
analyzing the first byte sequence using the software component, wherein analyzing the first byte sequence includes determining whether the first byte sequence is indicative of a trace identifier mismatch.

13. The method of claim 9 wherein determining when the first byte sequence differs from the second byte sequence on the hardware component is a part of a cyclic redundancy check.

14. A detection system for use in identifying trace identifier mismatches associated with paths within a network, the detection system comprising:
a hardware component, the hardware component including a memory and port arranged to receive bit streams, the hardware component further including a string change detection circuit, the string change detection circuit being arranged to detect changes in the bit streams and to provide an indication of the changes in the bit streams; and
a software component stored in computer-readable medium, the software component including code devices that are arranged to cause at least one bit stream of the bit streams to be obtained from the hardware component and code devices arranged to cause a determination of whether the at least one bit stream has a trace identifier mismatch.

15. The detection system of claim 14 wherein the hardware component is arranged to store the indication in the memory, and the software component include code devices arranged to cause the memory to be polled to obtain the indication.

16. The detection system of claim 15 wherein the software component includes code devices arranged to cause the hardware component to be provided with a request to capture the at least one bit stream after obtaining the indication.

17. The detection system of claim 16 wherein the hardware component is arranged to capture the at least one bit stream.

18. The detection system of claim 14 wherein the software component includes code devices arranged to cause a determination of whether the at least one bit stream has the trace identifier mismatch by comparing the at least one bit stream with an expected bit stream.

19. The detection system of claim 14 wherein the bit streams are associated with a plurality of paths, and the hardware component is arranged to monitor the plurality of paths substantially simultaneously.

20. The detection system of claim 14 wherein the string change detection circuit is arranged to perform a cyclic redundancy check.

21. A system for detecting trace identifier mismatches associated with paths within a network, the system comprising:
a hardware component having a memory, the hardware component further including means for causing a change in trace information associated with a first path to be detected and means that cause an indication of the change in trace information to be provided; and
a software component stored in a computer-readable medium, the software component having means for causing the indication to be obtained and means that cause the trace information to be analyzed to determine if a trace identifier mismatch is present.

22. The system of claim 21 wherein the software component further includes:
means for causing a trace identifier mismatch defect to be raised when it is determined that the trace identifier mismatch is present.

23. The system of claim 21 wherein the software component further includes:
means for causing the indication to be obtained include means for causing the memory of the hardware component to be polled using the software component.

24. The system of claim 23 wherein the means for causing the indication of the change in trace information to be provided include means for causing the indicator to be stored in the memory.

25. The system of claim 21 wherein the means that cause the change in trace information associated with the path to be detected include means for causing a cyclic redundancy check to be performed on the trace information.

* * * * *

UNITED STATES PATENT AND TRADEMARK OFFICE
CERTIFICATE OF CORRECTION

PATENT NO. : 7,603,588 B1
APPLICATION NO. : 10/827720
DATED : October 13, 2009
INVENTOR(S) : David Bailey Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1477 days.

Signed and Sealed this

Fifth Day of October, 2010

David J. Kappos
*Director of the United States Patent and Trademark Office*